UNITED STATES PATENT OFFICE.

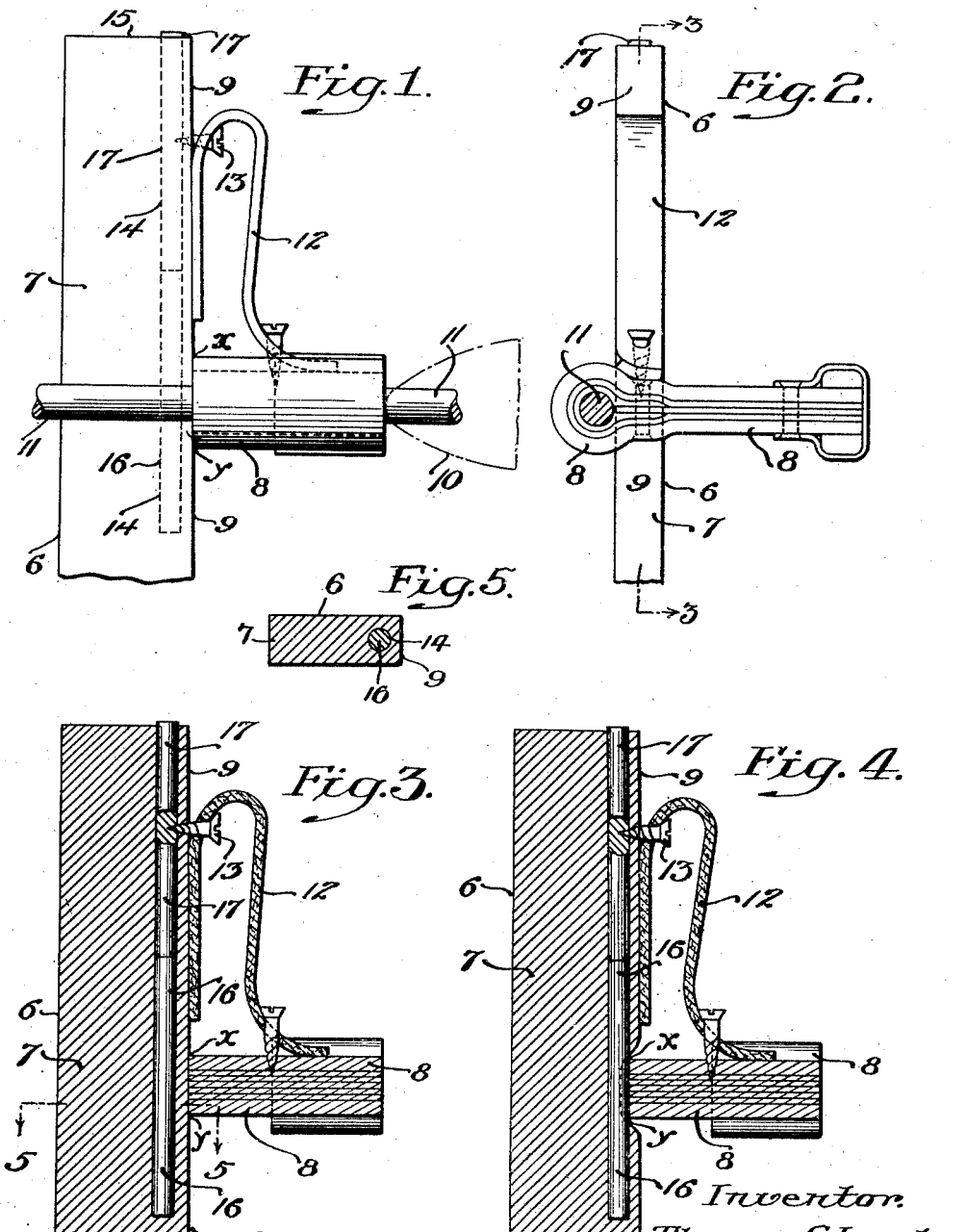

THOMAS C. LAWTON, OF PHILADELPHIA, PENNSYLVANIA.

PICKER-STICK FOR LOOMS.

1,372,438.  Specification of Letters Patent.  Patented Mar. 22, 1921.

Application filed April 10, 1920. Serial No. 372,962.

*To all whom it may concern:*

Be it known that I, THOMAS C. LAWTON, a citizen of the United States, residing at Philadelphia, in the county of Philadelphia and State of Pennsylvania, have invented certain new and useful Improvements in Picker-Sticks for Looms, of which the following is a specification.

Picker sticks, which are usually made of wood, soon wear out due to the severe action imposed upon them during their function of throwing the shuttle across the loom. The wear on the picker stick is usually greatest where the picker member, which is usually made of raw-hide and acts as an intervening member between the picker stick and the shuttle, contacts with the picker stick and on power looms this wear soon renders the picker stick of no further use even though the picker stick is made of an extremely tough wood. This constant and rapid wearing out of picker sticks has long been the source of trouble to weavers since it is often necessary to replace the picker stick after a couple of months' use on the loom.

One object of my invention is to prolong the life of a picker stick.

Another object is to provide means for the above purpose which will be of simple and inexpensive construction and which can be quickly and cheaply made.

These objects, and other advantageous ends which will be described hereinafter, I attain in the following manner, reference being had to the accompanying drawings in which—

Figure 1 is a fragmentary elevation showing my improved picker stick in its relative position to the shuttle and the intermediate member between the shuttle and the picker stick, Fig. 2 is a side elevation of Fig. 1, Fig. 3 is a section taken on the line 3—3 of Fig. 2, Fig. 4 is a view of similar character to Fig. 3 showing the same after having been used and illustrating how my invention serves to prolong the life of the picker stick, and Fig. 5 is a fragmentary section taken through the picker stick on the line 5—5 of Fig. 3.

Referring to the drawings, 6 represents a picker stick, the body portion 7 of which is preferably made of wood such for example as the wood from which picker sticks are usually made. A picker member 8, which may be made of laminated raw-hide and of any of the forms usually employed on looms, is interposed between the front surface 9 of the body portion 7 of the picker stick 6 and the shuttle 10; the latter being illustrated in dot-and-dash lines in Fig. 1. The member 8 usually slides on a rod 11 of the usual construction generally provided adjacent the shuttle boxes. The picker member 8 is usually connected to the picker stick by a flexible member such as a strap which is illustrated at 12 so that while the member 8 serves as the direct abutting means for the point of the shuttle 10 due to the swinging action of the picker stick 6, said member 8 is flexibly connected to the picker stick so that upon the return movement of the picker stick, after having thrown the shuttle, the member 8 will be pulled back and follow substantially the movement of the picker stick. In the present instance I have connected the flexible strap 12 with the picker stick by means of a screw 13. However, it will be understood that this means of connection may be made in any desirable manner and does not in itself constitute a part of my invention. The picker member 8 contacts with the surface 9 of the body portion 7 of the picker stick 6 between the points indicated at $x$ and $y$ and it is this constant engagement between the picker member 8 and the picker stick which soon causes the picker stick to wear out in a direction transversely of its height.

In carrying out my invention I drill a hole 14 downwardly from the top surface 15 of the body portion 7 of the picker stick 6; said hole extending to a level below the point $y$ as clearly shown in Fig. 1. This hole 14 is preferably made entirely within the width and thickness of the body portion 7 in an offset position or in other words not in a position centrally within the body portion. This offset portion is such as clearly shown in Fig. 5 and after drilling the hole 14 I insert a metallic rod 16 into the hole 14; said metallic rod being of such length as to extend from the bottom of the hole 4 to a position a considerable distance above the level of the point $x$. After inserting the metallic rod I preferably close the remaining upper portion of the hole 14 by means of a dowel pin 17, which may be made of wood, and if desired this pin can be glued into the hole 14 so as to prevent it from working loose and also for keeping the rod 16 in the position as above mentioned. The screw 13 can be inserted in such manner as to extend into the dowel pin 17 and thereby further assist in holding the dowel pin in position. When the picker stick 6 is new the picker member 8 will engage with the surface 9 in the usual manner and due to this action the body portion 7 will be worn between the points x and y on the surface 9 until the body portion is worn away between said points x and y to expose the metallic rod 16 between its ends. The picker member 8 will then contact with the metallic rod 16 between its ends and since the ends of said metallic rod are firmly anchored in the body portion 7 the wear upon the body portion of the picker stick will cease and since the rod 16 is made of metal the latter will practically last indefinitely. Fig. 3 shows the picker stick while new as above described and Fig. 4 shows the picker stick after the part of the body portion 7 between the surface 9 and the rod 16 has worn away so as to expose the rod 16 between the points x and y for engagement with the picker member 8.

The hole 14 forms a socket entirely within the body portion and is preferably formed as close to the surface 9 as possible. However it is necessary to allow enough of the body portion between the ends of the rod 16 and the surface 9 to firmly hold the ends of the rod 16 in position after the body portion has been worn as shown in Fig. 4.

While I have described the rod 16 as being made of metal I wish it understood that this rod may be made of other material just so that it is of greater wear-resisting strength than the material from which the body portion 7 of the picker stick 6 is made.

I am aware of the fact that reinforcing strips and other means have been used which are secured to the outer surface of a picker stick for the purpose of resisting wear but in view of the connection of said latter constructions which are usually made with screws, the same are not practical since after a short time they readily work loose due to the necessary severe action of the picker stick. I am not aware however of anyone inserting or embedding material within the body portion of a picker stick in which said material is of greater wear-resisting qualities than the body portion of the picker stick.

In the claims I have used the expression "wear-resisting means" and "material" and by this expression is meant any material which, due to contact with the picker elements of a loom, would wear longer than the material of the body portion if the latter received the contact of said picker elements. While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A picker stick including a body portion of wood having a hole located entirely within the confines of the transverse cross section of the body portion; and means inserted within said hole and of greater wear-resisting strength than said wood, said means being located so as to be operatively positioned to be intersected by the plane of movement of the picker action of a loom; substantially as described.

2. A picker stick having a body portion provided with a hole located entirely within the confines of the transverse cross section of the body portion adjacent a surface thereof which is adapted to resist the wear of the picker action of a loom; and means of greater wear-resisting material than that of said body portion inserted and held within said hole; substantially as described.

3. A picker stick having a body portion provided with an offset hole located adjacent a surface thereof; and means of greater wear-resisting material than that of said body portion held within said hole, said means having portions extending beyond either side of the plane of movement of a picking member adapted to engage said surface whereby when the part of said body portion between said means and said surface wears away due to engagement therewith by said picking member a part of said means will still remain embedded within said body portion; substantially as described.

4. A picker stick having a body portion provided with an offset hole located adjacent a surface thereof; a rod of greater wear-resisting material than that of said body portion inserted within said hole; and means for holding said rod within said hole, said rod having portions extending beyond either side of the plane of movement of a picking member adapted to engage said surface whereby when the part of said body portion between said rod and said surface wears away due to engagement therewith by said picking member a part of said rod will still remain in a part of said hole located to the side of said plane; substantially as described.

5. A picker stick including a body portion having a hole formed therein, one portion of which forms a socket within the width and thickness of the body portion; and means inserted and embedded within said socket, said means within the socket being of greater wear-resisting strength than said body portion and being adapted to be operatively positioned to be intersected by the plane of movement of the picker action of a loom; substantially as described.

6. A picker stick having a body portion provided with a hole located entirely within the confines of the transverse cross section of the body portion and extending downwardly therein and stopping short of the bottom; and a rod of greater wear-resisting material than that of said body portion inserted and held within said hole; substantially as described.

7. A picker stick having a body portion including a bored hole extending in the direction of the length of said stick; and means within said hole of greater wear-resisting strength than that of the body portion and adapted to be located so as to be intersected by the plane of movement of the picker action of a loom; substantially as described.

In testimony whereof I have signed my name to this specification in the presence of a subscribing witness.

THOMAS C. LAWTON.

Witness:
CHAS. E. POTTS.